J. M. Keep,

Hat & Coat Rack.

No. 109,017. Patented Nov. 8, 1870.

Witnesses.

Inventor.
James M. Keep,
by Prindle & Dyer,
Attys.

UNITED STATES PATENT OFFICE.

JAMES M. KEEP, OF NEW YORK, N. Y.

Letters Patent No. 109,017, dated November 8, 1870.

IMPROVEMENT IN COAT AND HAT-RACKS.

The Schedule referred to in these Letters Patent and making part of the same.

To all whom it may concern:

Be it known that I, JAMES M. KEEP, of New York city, in the county of New York and in the State of New York, have invented certain new and useful Improvements in Coat and Hat-Racks; and do hereby declare that the following is a full, clear, and exact description thereof, reference being had to the accompanying drawing making a part of this specification, in which—

Letters of like name and kind refer to like parts in each of the figures.

Figure 1:
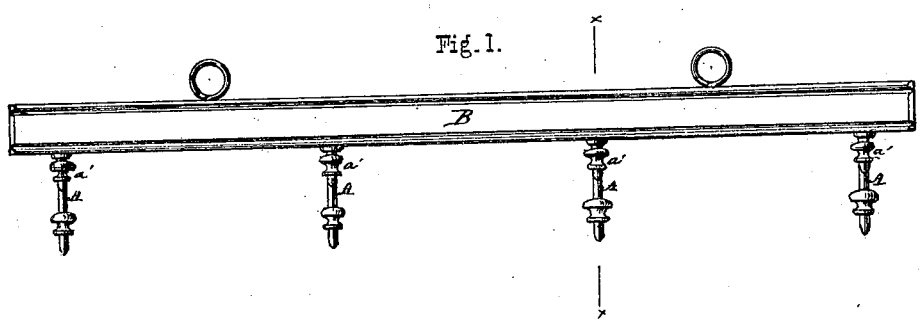
Figure 1 is a front elevation of my device.
Figure 2:
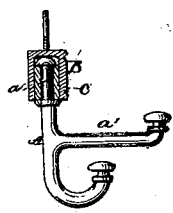
Figure 2 is a vertical cross-section of the same on the line $x\ x$ of fig. 1.
Figure 3:
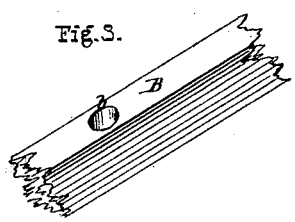
Figure 3 is a perspective view of the supporting-bar, showing its lower edge.
Figure 4:
Figure 4 is a like view of the collar used for securing the hooks within the bar.

The object of my invention is to provide a coat and hat-rack which, from the simplicity of its construction, can be furnished at a smaller cost than those now in use; and It consists, principally, in a rack in which the hooks are, by means of a single journal, pivoted within and swing beneath a single bar, substantially as is hereinafter shown.

It further consists in the peculiar shape of the hooks used, substantially as is hereinafter shown and described.

It finally consists in the means employed for pivoting the hooks to or within the bar, substantially as is hereinafter set forth.

In the annexed drawing—

A represents a vertical metal bar, provided, upon its upper end, with a journal, $a$, while its lower end curves outward and upward, and terminates in a knob or button.

A horizontal bar, $a'$, is secured to and extends downward from near the center of said bar A, in a line with its curved end, and terminates in a short upward curved end, upon which is a knob similar to that before mentioned, the whole forming a double hook.

As thus constructed, the hook is pivoted within a bar, B, in the following manner:

A wooden collar, C, corresponding in length and internal diameter with the journal $a$, and having an exterior diameter somewhat greater than that of the collars of said journal, is divided longitudinally and centrally, and placed upon the latter.

An opening, $b$, corresponding in size and length to the journal and collar, being provided within the lower side of the bar B, said collar is coated with glue, and (containing said journal) is driven into said opening, where, when the glue becomes fixed, the collar is firmly fastened, while the journal is allowed to turn freely within the same.

The especial advantages possessed by this construction of the rack are that by it the usual frame is dispensed with, and a single solid bar substituted in its place, while the hook, having but one journal, is more simple, and is easier to make.

Having thus fully set forth the nature and merits of my invention,

What I claim as new is—

1. A rack in which the hooks, by means of a single journal, are pivoted within and swing horizontally beneath a bar constructed of a single piece, substantially as is shown, and for the purpose specified.

2. The hook, journaled as above described, in combination with the divided collar, for securing the same within a solid bar, substantially as shown.

In testimony that I claim the foregoing, I have hereunto set my hand this 10th day of October, 1870.

J. M. KEEP.

Witnesses:
GEO. E. JEWETT,
GEO. P. BENSON.